United States Patent
Hillesund et al.

(10) Patent No.: US 11,119,236 B2
(45) Date of Patent: *Sep. 14, 2021

(54) AUTOMATED LATERAL CONTROL OF SEISMIC STREAMERS

(71) Applicant: PGS Geophysical AS, Oslo (NO)

(72) Inventors: Øyvind Hillesund, Nesbru (NO); Torbjørn Ursin, Oslo (NO); Toralf Lund, Stabekk (NO)

(73) Assignee: PGS GEOPHYSICAL AS, Oslo (NO)

(*) Notice: Subject to any disclaimer, the term of this patent is extended or adjusted under 35 U.S.C. 154(b) by 481 days.

This patent is subject to a terminal disclaimer.

(21) Appl. No.: 16/036,356

(22) Filed: Jul. 16, 2018

(65) Prior Publication Data

US 2018/0321408 A1 Nov. 8, 2018

Related U.S. Application Data

(63) Continuation of application No. 15/243,361, filed on Aug. 22, 2016, now Pat. No. 10,054,705, which is a continuation of application No. 13/831,362, filed on Mar. 14, 2013, now Pat. No. 9,423,519.

(51) Int. Cl.
*G01V 1/38* (2006.01)

(52) U.S. Cl.
CPC .......... *G01V 1/3826* (2013.01); *G01V 1/3817* (2013.01)

(58) Field of Classification Search
CPC ............................ G01V 1/3826; G01V 1/3817
USPC .......................................................... 367/17
See application file for complete search history.

(56) References Cited

U.S. PATENT DOCUMENTS

| | | | |
|---|---|---|---|
| 1,288,721 A | 12/1918 | Smith | |
| 2,275,692 A | 3/1942 | Sims | |
| 2,928,367 A | 3/1960 | Mccormick | |
| 2,980,052 A | 4/1961 | Fehlner | |
| 3,159,806 A | 12/1964 | Piasecki | |
| 3,375,800 A | 4/1968 | Cole et al. | |

(Continued)

FOREIGN PATENT DOCUMENTS

| | | |
|---|---|---|
| AU | 199853305 | 6/2001 |
| CA | 2270719 | 7/1998 |

(Continued)

OTHER PUBLICATIONS

Siems & Chien, "Technology for an Ultra-High-Resolution Marine Seismic Cable," Offshore Technology Conference 6557 (1991), pp. 509-516.

(Continued)

*Primary Examiner* — Daniel L Murphy

(57) ABSTRACT

In the field of marine geophysical surveying, systems and methods for controlling the spatial distribution or orientation of a geophysical sensor streamer or an array of geophysical sensor streamers towed behind a survey vessel are provided. Various techniques for changing the spatial distribution or orientation of such geophysical sensor streamers in response to changing conditions are provided. For example, crosscurrent conditions may be determined based on configuration data received from positioning devices along the length of a streamer, and a new desired orientation for the streamer may be determined based on the crosscurrent conditions. The new desired orientation may include a new desired feather angle for the streamer.

24 Claims, 5 Drawing Sheets

(56) References Cited

U.S. PATENT DOCUMENTS

| | | |
|---|---|---|
| 3,412,704 A | 11/1968 | Buller et al. |
| 3,412,705 A | 11/1968 | Nesson |
| 3,434,446 A | 3/1969 | Cole |
| 3,440,992 A | 4/1969 | Chance |
| 3,531,761 A | 9/1970 | Tickell et al. |
| 3,531,762 A | 9/1970 | Tickell |
| 3,541,989 A | 11/1970 | Leonard |
| 3,560,912 A | 2/1971 | Spink et al. |
| 3,581,273 A | 5/1971 | Hedberg |
| 3,605,674 A | 9/1971 | Weese |
| 3,648,642 A | 3/1972 | Fetrow et al. |
| 3,774,570 A | 11/1973 | Pearson |
| 3,896,756 A | 7/1975 | Pearson et al. |
| 3,931,608 A | 1/1976 | Cole |
| 3,943,483 A | 3/1976 | Strange |
| 3,961,303 A | 6/1976 | Paitson |
| 4,033,278 A | 7/1977 | Waters |
| 4,063,213 A | 12/1977 | Itria et al. |
| 4,087,780 A | 5/1978 | Itria et al. |
| 4,191,328 A | 3/1980 | Isaacs et al. |
| 4,222,340 A | 9/1980 | Cole |
| 4,227,479 A | 10/1980 | Gertler et al. |
| 4,231,111 A | 10/1980 | Neeley |
| 4,290,124 A | 9/1981 | Cole |
| 4,313,392 A | 2/1982 | Guenther et al. |
| 4,323,989 A | 4/1982 | Huckabee et al. |
| 4,404,664 A | 9/1983 | Zachariadis |
| 4,408,292 A | 10/1983 | Nakatani et al. |
| 4,463,701 A | 8/1984 | Pickett et al. |
| 4,484,534 A | 11/1984 | Thillaye du Boullay |
| 4,486,863 A | 12/1984 | French |
| 4,493,067 A | 1/1985 | Thomas et al. |
| 4,599,712 A | 7/1986 | Chelminski |
| 4,646,528 A | 3/1987 | Marcade et al. |
| 4,671,235 A | 6/1987 | Hosaka |
| 4,676,183 A | 6/1987 | Conboy |
| 4,694,435 A | 9/1987 | Magneville |
| 4,709,355 A | 11/1987 | Woods et al. |
| 4,711,194 A | 12/1987 | Fowler |
| 4,723,501 A | 2/1988 | Hoyden et al. |
| 4,729,333 A | 3/1988 | Kirby et al. |
| 4,745,583 A | 5/1988 | Motal |
| 4,766,441 A | 8/1988 | Phillips et al. |
| 4,767,183 A | 8/1988 | Martin |
| 4,809,005 A | 2/1989 | Counselman, III |
| 4,843,996 A | 7/1989 | Darche |
| 4,885,726 A | 12/1989 | Myers |
| 4,890,568 A | 1/1990 | Dolengowski |
| 4,890,569 A | 1/1990 | Givens |
| 4,912,684 A | 3/1990 | Fowler |
| 4,992,990 A | 2/1991 | Langeland et al. |
| 4,998,227 A | 3/1991 | Rygg et al. |
| 5,042,413 A | 8/1991 | Benoit |
| 5,050,133 A | 9/1991 | Buddery |
| 5,052,814 A | 10/1991 | Stubblefield |
| 5,062,583 A | 11/1991 | Lipps et al. |
| 5,094,406 A | 3/1992 | Shafer |
| 5,200,930 A | 4/1993 | Rouquette |
| 5,353,223 A | 10/1994 | Norton et al. |
| 5,363,343 A | 11/1994 | Klein |
| 5,402,745 A | 4/1995 | Wood |
| 5,404,339 A | 4/1995 | Cole, Jr. |
| 5,443,027 A | 8/1995 | Owsley et al. |
| 5,507,243 A | 4/1996 | Williams, Jr. et al. |
| 5,517,202 A | 5/1996 | Patel et al. |
| 5,517,463 A | 5/1996 | Hornbostel et al. |
| 5,529,011 A | 6/1996 | Williams, Jr. |
| 5,532,975 A | 7/1996 | Elholm |
| 5,619,474 A | 4/1997 | Kuche |
| 5,642,330 A | 6/1997 | Santopietro |
| 5,771,202 A | 6/1998 | Bale et al. |
| 5,784,335 A | 7/1998 | Deplante et al. |
| 5,790,472 A | 8/1998 | Workman et al. |
| 5,913,280 A | 6/1999 | Nielsen et al. |
| 5,920,828 A | 7/1999 | Norris et al. |
| 5,973,995 A | 10/1999 | Walker et al. |
| 6,011,752 A | 1/2000 | Ambs et al. |
| 6,011,753 A | 1/2000 | Chien |
| 6,016,286 A | 1/2000 | Olivier et al. |
| 6,028,817 A | 2/2000 | Ambs |
| 6,079,882 A | 6/2000 | Chien |
| 6,144,342 A | 11/2000 | Bertheas et al. |
| 6,418,378 B1 | 7/2002 | Nyland |
| 6,459,653 B1 | 10/2002 | Kuche |
| 6,525,992 B1 | 2/2003 | Olivier et al. |
| 6,549,653 B1 | 4/2003 | Osawa et al. |
| 6,671,223 B2 | 12/2003 | Bittleston |
| 6,691,038 B2 | 2/2004 | Zajac |
| 6,879,542 B2 | 4/2005 | Soreau et al. |
| 6,932,017 B1 | 8/2005 | Hillesund et al. |
| 7,080,607 B2 | 7/2006 | Hillesund et al. |
| 7,162,967 B2 | 1/2007 | Hillesund et al. |
| 7,293,520 B2 | 11/2007 | Hillesund et al. |
| 7,376,045 B2 | 5/2008 | Falkenberg et al. |
| 7,822,552 B2 | 10/2010 | Bittleston |
| 8,230,801 B2 | 7/2012 | Hillesund et al. |
| 8,391,102 B2 | 3/2013 | Holo |
| 9,423,519 B2 | 8/2016 | Hillesund et al. |
| 10,054,705 B2* | 8/2018 | Hillesund ............ G01V 1/3826 |
| 2006/0227657 A1 | 10/2006 | Tveide et al. |
| 2006/0285434 A1 | 12/2006 | Welker et al. |
| 2008/0008032 A1 | 1/2008 | Welker |
| 2008/0008033 A1 | 1/2008 | Fossum et al. |
| 2010/0118644 A1 | 5/2010 | Seale et al. |
| 2011/0286302 A1 | 11/2011 | Welker et al. |
| 2012/0002502 A1 | 1/2012 | Hillesund et al. |

FOREIGN PATENT DOCUMENTS

| | | |
|---|---|---|
| CN | 1301350 A | 6/2001 |
| CN | 1321250 | 11/2001 |
| CN | 1947032 | 4/2007 |
| CN | 101825723 | 9/2010 |
| CN | 102209914 | 10/2011 |
| DE | 69702673 T2 | 7/1998 |
| EP | 193215 | 9/1986 |
| EP | 0168959 | 8/1988 |
| EP | 0319716 A2 | 6/1989 |
| EP | 0321705 A2 | 6/1989 |
| EP | 390987 | 10/1990 |
| EP | 0525391 A1 | 2/1993 |
| EP | 581441 | 2/1994 |
| EP | 613025 | 8/1994 |
| EP | 909701 | 4/1999 |
| EP | 1850151 | 10/2007 |
| EP | 2360496 | 8/2011 |
| EP | 2474840 | 7/2012 |
| GB | 2093610 | 9/1983 |
| GB | 2122562 | 1/1984 |
| GB | 2320706 | 7/1998 |
| GB | 2331971 | 6/1999 |
| GB | 2342081 | 4/2000 |
| WO | 84/03153 | 8/1984 |
| WO | 95/31735 | 11/1995 |
| WO | 96/21163 | 7/1996 |
| WO | 97/11394 | 3/1997 |
| WO | 97/11395 | 3/1997 |
| WO | 97/30361 | 8/1997 |
| WO | 97/45006 | 12/1997 |
| WO | 98/28636 | 7/1998 |
| WO | 99/04293 | 1/1999 |
| WO | 00/20895 | 4/2000 |
| WO | 2000/020895 | 4/2000 |
| WO | 01/16623 | 3/2001 |
| WO | 01/61380 | 8/2001 |
| WO | 2010/054137 | 5/2010 |

OTHER PUBLICATIONS

Smith, It's all acquisition's fault, Exploration & Production, Mar. 2011, 4 pages.

Spector, Design Guide: Pin Fasteners: Part 2—Quick-Release Attachment, Machine Design (Dec. 12, 1957), pp. 166-173.

(56) References Cited

OTHER PUBLICATIONS

Triantafyllou, Dynamics of Cables, Towing Cables and Mooring Systems, 23 Shock & Vibration Dig., No. 7 (1991), 8 pages.
Watts et al., "Reservoir Monitoring of the Magnus Field through 4D time-lapse seismic analysis," Petroleum Geoscience vol. 2 (1996), pp. 361-372.
Yilmaz, Seismic Data Analysis: Processing, Inversion, and Interpretation of Seismic Data, vol. 2 Chapter 6: 3-D Seismic Exploration (1987), pp. 385-395.
Zinn & Rapatz, Reliability Analysis in Marine Seismic Network, A Paper Reprinted from The Hydrographic Journal No. 76 (Apr. 1995), pp. 11-18.
Office Action in Chinese Appl. No. 201811213473.4 dated Nov. 5, 2019, 6 pages.
Allen, et al., "Centralized Marine Control System," SEG Annual Meeting, Nov. 2-6, 1986, pp. 643-644.
Allen, et al., "Increased Flexibility in Marine Seismic Recording Systems," ASEG/SEG Conference—Adelaide (1988), pp. 223-226.
Barry, Cavers, & Kneale, Geophysics, Report on recommended standards for digital tape formats: Geophysics, 40, No. 02, 1975, pp. 344-352.
Beckett, et al., "Reducing 3D Seismic Turnaround," Oilfield Review (Jan. 1995), pp. 23-37.
Bedenbender, Johnston, & Neitzel, Electroacoustic Characteristics of Marine Seismic Streamers, Geophysics, vol. 35, No. 6 (Dec. 1970), pp. 1054-1072.
Biondo L. Biondi, 3D Seismic Imaging, Investigations in Geophysics Series No. 14, Chapter 9: Imaging and Partial Subsurface Illumination (2006), pp. 123-141.
Brice, et al., "Perturbations in 4D marine seismic," ASEG 15th Geophysical Conference & Exhibition, Aug. 2001, 4 pages.
Bross & Longo, Latches for Quick-Release Fastening , Machine Design (Aug. 9, 1984), 6 pages.
Chopra, Expert Answers: Multistreamer/multisource acquisition, The Leading Edge, May 2005, pp. 472-476.
Cotton & Sanders, "The Reality of Trace Binning in 3-D Marine Surveying," Seismic 21, S21.5 (1983), pp. 565-568.
Court, "Streamer Compass Validation and Verification," Geophysics vol. 58 No. 4 (Apr. 1993), pp. 589-592.
von Doenhoff et al., Investigation of the Variation of Lift Coefficient with Reynolds Number at a Moderate Angle of Attack on a Low-Drag Airfoil , NACA (Nov. 1942), 21 pages.
Dowling, "The dynamics of towed flexible cylinders, Part 1: Neutrally buoyant elements," J. Fluid Mech., vol. 187 (1988), pp. 507-532.
Evans, A Handbook for Seismic Data Acquisition in Exploration, Society of Exploration Geophysicists, No. 7, 1997, pp. 4, 9, 38, 149-151, 238, and 250.
Gadallah, Reservoir Seismology: Geophysics in Nontechnical Language, PennWell Books, (1994). pp. 86, 89, 221, 223 and 368.
Gardner & Canning, "Effects of irregular sampling on 3-D prestack migration," SP4.7, SEG Abstracts, 1994, pp. 1553-1556.
Gikas, "Least Squares Filtering and Testing for Positioning and Quality Control During 3D Marine Seismic Surveys," Full Thesis, Department of Surveying University of Newcastle upon Tyne dated Aug. 1996, 7 pages.
Gikas, et al., The Hydrographic Journal, No. 77, Jul. 1995, pp. 11-24.
Gobat, Grosenbaugh, & Triantafyllou, Woods Hole Oceanographic Inst., WHOI Cable: Time Domain Numerical Simulation of Moored and Towed Oceanographic Systems, Technical Report (Nov. 1997), 106 pages.
Gobat, Grosenbaugh, & Triantafyllou, "Generalized-α Time Integration Solutions for Hanging Chain Dynamics," 128 J. of Engineering Mechanics, 128 (6), Jun. 2002, pp. 677-687.
Gobeli & Liner, "Bin Size and Linear v(z)," Society of Exploration Geophysics Technical Program Expanded Abstracts, 1996, pp. 47-50.
Goudey, "A Quick-Release Hook for Lifeboats and Offshore Rigging," IEEE 1982, pp. 728-731.
Hartung, et. al, "Successful Introduction of New 4D Technology Into the Business—Time Lapse Seismic in Gannet-C," EAGE 62nd Conference and Technical Exhibition, May 29-Jun. 2, 2000, 2 pages.
Hecht, City of Light: The Story of Fiber Optics, Chapter 14: Three Generations in Five Years (1999), pp. 176-200.
Houston, "Cable positioning using compasses, tailbuoys, and acoustic devices," SEG Expanded Abstracts (1991), pp. 761-763.
Jack, Time-Lapse Seismic in Reservoir Management, SEG 1997, 291 pages.
Johnston, et. al., "Time-lapse seismic analysis of the North Sea Fulmer Field," SEG Extended Abstracts (1997), pp. 890-893.
Jones, Marine Geophysics,University College London, 1999, p. 89.
Keggin & Ekren, 4D Seismic Repeatability Over the Gullfaks Field—Source and Receiver Positioning Issues, EAGE Winter Symposium, Reservoir Geophysics: The Road Ahead, Oct. 27-30, 1996, 2 pages.
Krail & Brysk, "The Shape of a Marine Streamer in a Cross Current," Geophysics vol. 54, No. 3, (Mar. 1989), pp. 302-308.
Lambert, et al., "Marine Seismic Survey Positioning and Control Requirements Evolve," Offshore, Mar. 2003, 4 pages.
Liner, Elements of 3-D Seismology, PenWell (1999), pp. 104-105, 206-209.
Loweth, Manual of Offshore Surveying for Geoscientists and Engineers, Chapters 3, 4, and 5, Chapman & Hall (1997), pp. 31-49, 51-70, 71-93.
Lumley, et al., "Assessing the Technical Risk of a 4D Seismic Project," SEG Technical Program Expanded Abstracts (1997), pp. 894-897.
Marsh, et. al., "The Use of 4D Seismic in Reservoir Management," EAGE 63rd Conference & Technical Exhibition, Jun. 11-15, 2001, 6 pages.
Martin, et al., "Acquisition of marine point receiver seismic data with a towed streamer," SEG Expanded Abstracts, 2000, 5 pages.
McBarnet, "Interpreting Reservoir Talk," Offshore Engineer, Sep. 4, 2003, 6 pages.
McBarnet, "Moving up the Q," Offshore Engineer, Jun. 2008, 3 pages.
McKeown, "Acoustic Positioning of Oceanographic Instruments," IEEE—Engineering in the Ocean Environment Conference. vol. 2 (1974), pp. 150-154.
Morice, et al., "4D-ready marine seismic data," 70th Annual International Meeting, SEG Expanded Abstracts (2000), pp. 1607-1610.
Morice, et al., SPE 63136: 4D-Ready Towed-Streamer Data and the Foinaven Benchmark, Oct. 2000, pp. 1-7.
Newman, Marine Hydrodynamics, Chapter 2: Model Testing (1977), 49 pages.
Osdal, et al., "Mapping the Fluid Front and Pressure Buildup using 4D Data on Norne Field," The Leading Edge, Sep. 2006, pp. 1134-1141.
Paidoussis, Fluid-Structure Interactions: Slender Structures and Axial Flow, vol. 1, Academic Press (1998), 9 pages.
Peacock, et al., "Advanced Acoustic Design for a New Seismic Streamer," SEG Technical Program Expanded Abstracts (1983), pp. 465-466.
Peardon, et al., "Acoustic and Mechanical Design Considerations for Digital Streamers," SEG Technical Program Expanded Abstracts (1986), pp. 291-294.
Pennington, "A Brief History and Overview of Reservoir Geophysics," in Methods and Applications in Reservoir Geophysics (David H. Johnston ed., 2010), pp. 21-28.
Proffitt, "A History of Innovation in Marine Seismic Data Acquisition," Geophysics: The Leading Edge of Exploration, vol. 10 No. 3 (Mar. 1991), pp. 24-30.
Robertson, "Reservoir Management Using 3-D Seismic Data," Geophysics: The Leading Edge of Exploration (Feb. 1989), pp. 25-31.
Satter, et al., "Integrated Reservoir Management," Society of Petroleum Engineers (Dec. 1994), pp. 1057-1064.
Office Action in Mexican Patent Application No. MX/a/2016/015640 dated Jul. 25, 2018, 2 pages.

(56) References Cited

OTHER PUBLICATIONS

Examination Report in AU Appl. No. 2018201698 dated Mar. 25, 2019, 2 pages.
Andrew McBarnet, "Moving up the Q," Offshore Engineer, www.offshore-engineer.com, Jun. 2008, 3 pages.
Nick Moldoveanu and Jerry Kapoor, "Patterns of progress," Seismic Technology and Market Update, WesternGeco, E & P, Nov. 2008, www.EPmag.com, 3 pages.
Tim Bunting, et al., "Marine broadband case study offshore China," technical article: first break, vol. 29, Sep. 2011, pp. 67-74.
Oilfield Review—Time-Lapse Seismic Data, Multicomponent Seismic Methods, The Future of Produced Water, Summer 2004, Schlumberger, pp. 1-62.
Office Action in Mexican Application No. MX/a/2014/003056 dated Feb. 2, 2016, 8 pages.
Extended European Search Report in Application No. 14158564.6 dated Mar. 24, 2016, 9 pages.
Eurasion Patent Search Report in Application No. 201490430 dated Jul. 22, 2014, 4 pages.
Office Action in U.S. Appl. No. 13/831,362 dated Sep. 8, 2015, 18 pages.
Office Action in U.S. Appl. No. 13/831,362 dated Mar. 30, 2016, 10 pages.
Office Action in Chinese Application No. 201410094906.4 dated Apr. 12, 2017, 14 pages.
Chunjie, et al., "Attitude control of marine seismic streamer under transverse flow," Journal of Dalian Maritime University, vol. 37, No. 1, Feb. 28, 2011, pp. 9-12 and 17.
Examination Report in Australian Application No. 2014201471 dated Jul. 21, 2017, 3 pages.
"Notice to ARS Patent in re Eurasian Patent Application No. 201890617/31," Eurasian Patent Office, dated Oct. 1, 2019.
Office Action in European Appl. No. 14158564.6 dated Feb. 26, 2019, 4 pages.

\* cited by examiner

AUTOMATED LATERAL CONTROL OF SEISMIC STREAMERS

The present application is a continuation of U.S. application Ser. No. 15/243,361, filed Aug. 22, 2016, which is a continuation of U.S. application Ser. No. 13/831,362, filed Mar. 14, 2013 (now U.S. Pat. No. 9,423,519); the disclosures of each of the above-referenced applications are incorporated by reference herein in their entireties.

BACKGROUND

Technical Field

The disclosure relates generally to the field of marine geophysical surveying. More particularly, the disclosure relates to systems and methods for controlling the spatial distribution or orientation of geophysical sensor streamer or an array of geophysical sensor streamers towed behind a survey vessel.

Description of the Related Art

Marine geophysical surveying systems such as seismic acquisition systems and electromagnetic survey systems are used to acquire geophysical data from formations disposed below the bottom of a body of water, such as a lake or the ocean. Marine seismic surveying systems, for example, typically include a seismic survey vessel having onboard navigation, seismic energy source control, and geophysical data recording equipment. The seismic survey vessel is typically configured to tow one or more (typically a plurality) laterally spaced sensor streamers through the water. At selected times, the seismic energy source control equipment causes one or more seismic energy sources (which may be towed in the water by the seismic vessel or by another vessel) to actuate. Signals generated by various sensors on the one or more streamers in response to detected seismic energy are ultimately conducted to the recording equipment. A record is made in the recording system of the signals generated by each sensor (or groups of such sensors). The recorded signals are later interpreted to infer the structure and composition of the formations below the bottom of the body of water. Corresponding components for inducing electromagnetic fields and detecting electromagnetic phenomena originating in the subsurface in response to such imparted fields may also be used in marine electromagnetic geophysical survey systems.

The one or more sensor streamers are in the most general sense long cables that have geophysical sensors disposed at spaced-apart positions along the length of the cables. A typical streamer may extend behind the geophysical survey vessel for several kilometers. Because of the great length of the typical streamer, the streamer may not travel entirely in a straight line behind the survey vessel at every point along its length due to interaction of the streamer with the water, among other factors.

Streamers towed by a vessel configured for towing multiple streamers are generally associated with equipment that maintains the forward ends of the streamers at selected lateral distances from each other and from the centerline of the survey vessel as they are towed through the water. Single streamers are generally used in what are known as two-dimensional geophysical surveys, and multiple streamer systems are used in what are known as three-dimensional and four-dimensional surveys. A four-dimensional seismic survey is a three dimensional survey over a particular area of the Earth's subsurface repeated at selected times. The individual streamers in such systems are generally affected by the same forces that affect a single streamer.

The quality of geophysical images of the Earth's subsurface produced from three-dimensional surveys is affected by how well the positions of the individual sensors on the streamers are controlled. The quality of images generated from the detected signals also depends to an extent on the relative positions of the sensors being maintained throughout the geophysical survey.

Various embodiments of streamer control systems and methods are disclosed in U.S. Patent Publication 2012/0002502, entitled "METHODS FOR GATHERING MARINE GEOPHYSICAL DATA," which is incorporated by reference herein.

SUMMARY

A method according to one aspect of this disclosure includes towing a streamer behind a vessel in a body of water. Information is received relating to crosscurrents in the body of water, and a desired orientation for the streamer is determined based on that information. The orientation of the streamer is then adjusted in accordance with the desired orientation.

A method according to another aspect of this disclosure includes towing a streamer having deflecting devices arranged therealong in a body of water. The streamer is towed with a present streamer feather angle measured relative to some reference axis. The method includes receiving information regarding forces exerted by the deflecting devices and automatically determining a desired streamer feather angle based on the received information. The method further includes automatically adjusting the streamer, via the deflecting devices, to follow the desired streamer feather angle.

A streamer control apparatus according to one aspect of this disclosure includes at least one processor configured to communicate with positioning devices arranged along a streamer towed behind a vessel in a body of water. The processor is further configured to determine configuration data corresponding to the positioning devices, the configuration data being indicative of crosscurrent conditions. The processor is further configured to adjust the positioning devices based on the crosscurrent conditions.

DETAILED DESCRIPTION

Figure 1:
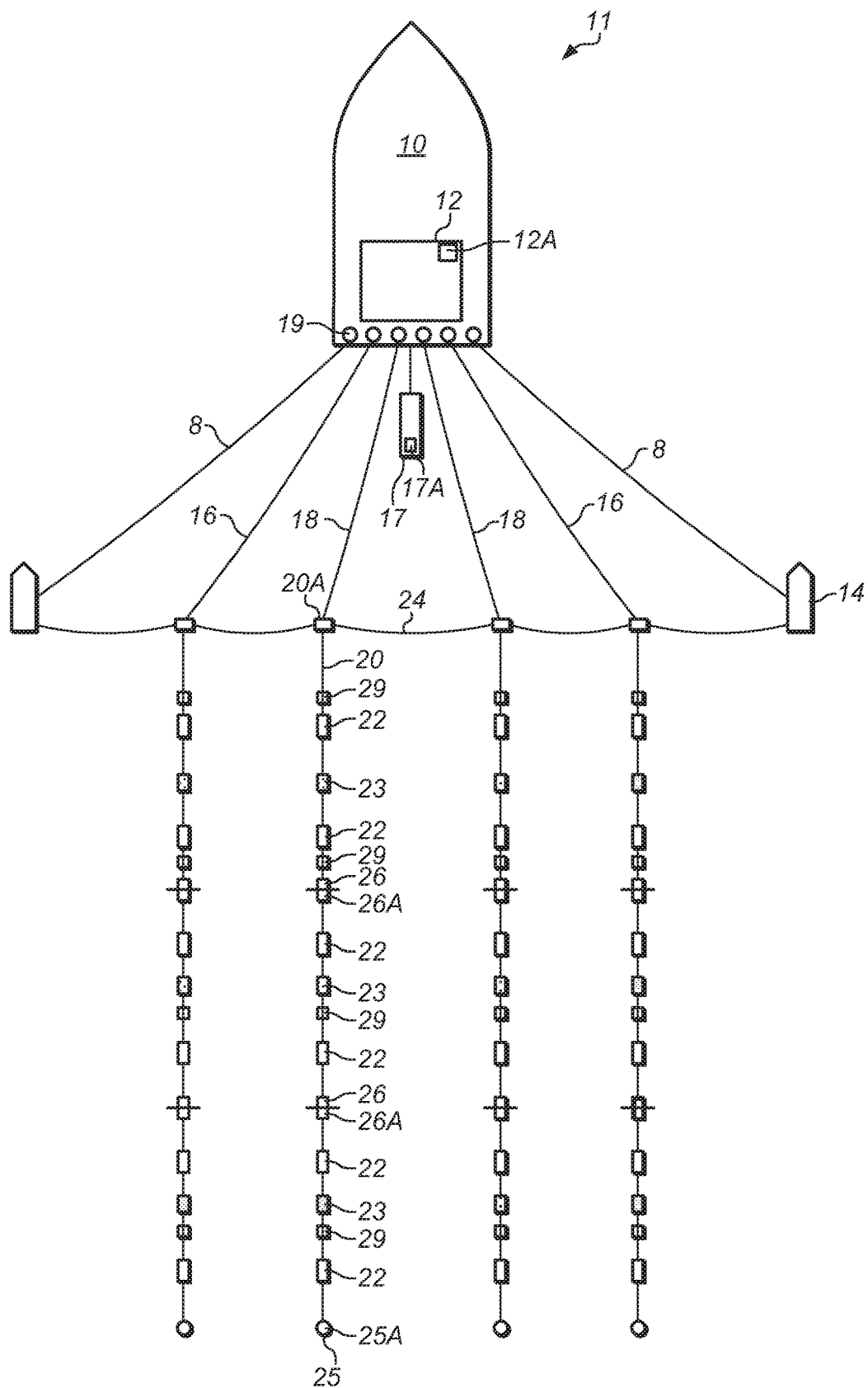
FIG. 1 depicts a vessel towing an array of seismic streamers including devices for adjusting the geometry of the respective streamers.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Based On." As used herein, this term is used to describe one or more factors that affect a determination. This term does not foreclose additional factors that may affect a determination. That is, a determination may be solely based on those factors or based only in part on those factors. Consider the phrase "determine A based on B." This phrase connotes that B is a factor that affects the determination of A, but does not foreclose the determination of A from also being based on C. In other instances, A may be determined based solely on B.

"Configured To." As used herein, this term means that a particular piece of hardware or software is arranged to perform a particular task or tasks when operated. Thus, a system that is "configured to" perform task A means that the system may include hardware and/or software that, during operation of the system, performs or can be used to perform task A. (As such, a system can be "configured to" perform task A even if the system is not currently operating.)

"Orientation." As used herein, this term includes any information regarding the geometric arrangement of a streamer. As non-limiting examples, the term "orientation" may include the feather angle of a streamer relative to some reference axis, the shape of a streamer, the position of a streamer relative to another streamer, or the position of a portion of a streamer.

"Feather angle." As used herein, this term refers to the angle that a streamer makes relative to some reference axis. Because a streamer may not always be arranged along a perfectly straight line, this term should be interpreted to encompass any suitable way of defining an average or approximate angle for such streamers. As non-limiting examples of such methods, the "approximate direction" for a streamer might be defined as the line connecting one end of the streamer to the other end; alternatively, the approximate direction might be defined as a line of best fit, which might be calculated discretely or continuously in various ways.

"Desired feather angle." As used herein, this term refers to the feather angle that an operator or control system attempts to cause a streamer to make relative to a reference axis. Typically, but not always, a "desired feather angle" will be a streamer orientation that is along a straight line. As above, however, this term should also be interpreted to encompass any suitable way of defining an average or approximate desired angle for such streamers.

"Automatic." As used herein, this term includes anything done by a hardware or software control device.

"Coupled." As used herein, this term includes a connection between components, whether direct or indirect.

"Lateral control device." As used herein, this term includes various devices for positioning streamers laterally. In this disclosure, such devices may be referred to variously as "lateral control devices," "lateral force control devices," "birds," "positioning devices," "lateral positioning devices," and "deflecting devices." These terms should also be understood to encompass devices providing additional capabilities, such as depth control; for example, terms such as "lateral force and depth control devices," "LFDs," and the like may also be used to refer to such devices.

FIG. 1 shows a typical marine geophysical survey system that may include a plurality of sensor streamers. Each of the sensor streamers may be guided through the water by one or more lateral control devices coupled to each of the streamers. The geophysical survey system includes survey vessel 10 that moves along the surface of body of water 11 such as a lake or the ocean. Survey vessel 10 may include thereon equipment, shown generally at 12 and for convenience collectively referred to as a "recording system." Recording system 12 typically includes devices such as a data recording unit (not shown separately) for making a record with respect to time of signals generated by various sensors in the acquisition system. Recording system 12 also typically includes navigation equipment (not shown separately) to determine and record, at selected times, the geodetic position of survey vessel 10, and, using other devices to be explained below, each of a plurality of geophysical sensors 22 disposed at spaced-apart locations on streamers 20 towed by survey vessel 10.

In one example, the device for determining the geodetic position may be geodetic position signal receiver 12A such as a global positioning system ("GPS") receiver, shown schematically at 12A. Other geodetic position determination devices are known in the art, such as other global navigation satellite systems. The foregoing elements of recording system 12 are familiar to those skilled in the art, and with the exception of geodetic position detecting receiver 12A, are not shown separately in the figures herein for clarity of the illustration.

Geophysical sensors 22 may be any type of geophysical sensor known in the art. Non-limiting examples of such sensors may include particle-motion-responsive seismic sensors such as geophones and accelerometers, pressure-responsive seismic sensors, pressure-time-gradient-responsive seismic sensors, electrodes, magnetometers, temperature sensors or combinations of the foregoing. In various implementations of the disclosure, geophysical sensors 22 may measure, for example, seismic or electromagnetic field energy primarily reflected from or refracted by various structures in the Earth's subsurface below the bottom of body of water 11 in response to energy imparted into the subsurface by energy source 17. Seismic energy, for example, may originate from a seismic energy source, or an array of such sources, deployed in body of water 11 and towed by survey vessel 10 or by another vessel (not shown). Electromagnetic energy may be provided by passing electric current through a wire loop or electrode pair (not shown for clarity). The energy source (not shown) may be towed in body of water 11 by survey vessel 10 or a different vessel (not shown). Recording system 12 may also include energy source control equipment (not shown separately) for selectively operating energy source 17.

In the survey system shown in FIG. 1, there are four sensor streamers 20 towed by survey vessel 10. The number of sensor streamers shown in FIG. 1, however, is only for purposes of illustration and is not a limitation on the number of streamers that may be used in any particular embodiment. As explained in the Background section herein, in marine geophysical acquisition systems such as shown in FIG. 1 that include a plurality of laterally spaced-apart streamers, streamers 20 are typically coupled to towing equipment that secures the forward end of each of streamers 20 at a selected lateral position with respect to adjacent streamers and with respect to survey vessel 10. As shown in FIG. 1, the towing equipment may include two paravanes 14 coupled to survey vessel 10 via paravane tow ropes 8. Paravanes 14 are the outermost components in the streamer spread and are used to provide streamer separation.

Paravane tow ropes 8 are each coupled to survey vessel 10 at one end through winch 19 or a similar spooling device that enables changing the deployed length of each paravane tow rope 8. In the embodiment shown, the distal end of each paravane tow rope 8 is coupled to paravanes 14. Paravanes 14 are each shaped to provide a lateral component of motion to the various towing components deployed in body of water 11 when paravanes 14 are moved therethrough. The lateral motion component of each paravane 14 is opposed to that of the other paravane 14. The combined lateral motion component of paravanes 14 separates paravanes 14 from each other until they put into tension one or more spreader ropes or cables 24, coupled end to end between paravanes 14.

Streamers 20 may each be coupled, at the axial end thereof nearest survey vessel 10 (the "forward end"), to respective lead-in cable terminations 20A. Lead-in cable terminations 20A may be coupled to or associated with spreader ropes or cables 24 so as to fix the lateral positions of streamers 20 with respect to each other and with respect to the centerline of survey vessel 10. Electrical, optical, and/or any other suitable connection between the appropriate components in recording system 12 and, ultimately, geophysical sensors 22 (and/or other circuitry) in the ones of streamers 20 inward of the lateral edges of the system may be made using inner lead-in cables 18, each of which terminates in respective lead-in cable termination 20A. Lead-in termination 20A is disposed at the forward end of each streamer 20. Corresponding electrical, optical, and/or other suitable connection between the appropriate components of recording system 12 and geophysical sensors 22 in the laterally outermost streamers 20 may be made through respective lead-in terminations 20A, using outermost lead-in cables 16. Each of innermost lead-in cables 18 and outermost lead-in cables 16 may be deployed by respective winches 19 or similar spooling devices such that the deployed length of each cable 16, 18 may be changed. The type of towing equipment coupled to the forward end of each streamer shown in FIG. 1 is only intended to illustrate a type of equipment that can tow an array of laterally spaced-apart streamers in the water. Other towing structures may be used in other examples of geophysical acquisition system according to the present disclosure.

The acquisition system shown in FIG. 1 may also include a plurality of lateral control devices 26 coupled to each streamer 20 at selected positions along each streamer 20. Each lateral control device 26 may include one or more rotatable control surfaces (not shown separately in FIG. 1; see FIG. 2 for an exemplary embodiment) that when moved to a selected rotary orientation with respect to the direction of movement of such surfaces through the water 11 creates a hydrodynamic lift in a selected direction to urge streamer 20 in a selected direction. Thus, such lateral control devices 26 may be used to maintain streamers 20 in a selected orientation. The particular design of the lateral control devices 26, however, is not a limit on the scope of the present disclosure.

In one embodiment, position determination devices may be associated with lateral control devices 26. In one example, the position determination device may be an acoustic range sensing device ("ARD") 26A. Such ARDs typically include an ultrasonic transceiver or transmitter and electronic circuitry configured to cause the transceiver to emit pulses of acoustic energy. Travel time of the acoustic energy between a transmitter and a receiver disposed at a spaced-apart position such as along the same streamer and/or on a different streamer, is related to the distance between the transmitter and a receiver, and the acoustic velocity of the water. The acoustic velocity may be assumed not to change substantially during a survey, or it may be measured by a device such as a water velocity test cell. Alternatively or additionally, ARDs may be disposed at selected positions along each one of the streamers not co-located with the lateral control devices 26. Such ARDs are shown at 23 in FIG. 1. Each ARD 26A, 23 may be in signal communication with recording system 12 such that at any moment in time the distance between any two ARDs 26A, 23 on any streamer 20 is determinable. One or more ARDs may be placed at selected positions proximate the rear end of survey vessel 10 so that relative distances between the selected positions on survey vessel 10 and any of the ARDs on the streamers may also be determined.

Streamers 20 may additionally or alternatively include a plurality of heading sensors 29 disposed at spaced-apart positions along each streamer 20. Heading sensors 29 may be geomagnetic direction sensors such as magnetic compass devices affixed to the exterior of streamer 20. Heading sensors 29 provide a signal indicative of the heading (direction with respect to magnetic north) of streamer 20 at the axial position of heading sensor 29 along the respective streamer. Measurements of such heading at spaced-apart locations along each streamer may be used to interpolate the orientation (including the spatial distribution) of each streamer.

Each streamer 20 may include at the distal end thereof a tail buoy 25. Tail buoy 25 may include, among other sensing devices, geodetic position receiver 25A such as a GPS receiver that may determine the geodetic position of each tail buoy 25. The geodetic position receiver 25A in each tail buoy 25 may be in signal communication with recording system 12.

By determining the distance between ARDs 26A, 23, including the one or more ARDs on survey vessel 10, and/or by interpolating the spatial distribution of the streamers from heading sensor 29 measurements, an estimate of the orientation of each streamer 20 may be made. Collectively, the orientation of streamers 20 may be referred to as the "array orientation."

The various position measurement components described above, including those from heading sensors 29, from ARDs 26A, 23, and, if used, from additional geodetic position receivers 25A in tail buoys 25, may be used individually or in any combination. The ARDs and heading sensors may be referred to for convenience as "relative position determination" sensors. By determining relative positions at each point along each streamer with reference to a selected point on the survey vessel or the energy source, is it possible to determine the geodetic position of each such streamer point if the geodetic position of the vessel or the energy source is determined. As explained above, the navigation portion of recording system 12 may include a GPS receiver or any other geodetic location receiver 12A. In some examples, energy source 17 may also include a geodetic position location receiver 17A such as a GPS receiver.

During operation of the geophysical acquisition system shown in FIG. 1, it may be desirable to adjust portions of the streamers 20 laterally in order to maintain a desired streamer orientation or array orientation during geophysical surveying. Recording system 12 may be configured to send suitable control signals to each lateral control device 26 to move associated portions of each streamer 20 laterally. Such lateral motion may be selected so that each point along each streamer is located at a predetermined relative position at any moment in time. The relative positions may be referenced to the position of either survey vessel 10 or energy source 17. Examples of various array orientation control modes according to this disclosure are provided below.

During operation of the acquisition system shown in FIG. 1 when used for seismic surveying, for example, it may be desirable for streamers 20 to be arranged as evenly as practicable behind survey vessel 10 to avoid holes in the survey coverage. "Evenly" or "even" in the present context means that it is desirable that streamers 20 are parallel to each other along their length, that there is equal lateral distance between adjacent streamers, and that the streamers extend parallel to a selected direction. Deviation from such an even arrangement may be caused by rip currents, crosscurrents, and propeller wash from survey vessel 10, among other causes. Holes in the coverage is a condition wherein seismic sensors are disposed more sparsely than would be the case if the orientation of the array were even, as defined above.

For purposes of this disclosure, the term "parallel" may be defined in terms of the "approximate directions" of streamers, as were discussed above. One of ordinary skill in the art will recognize that different levels of parallelism may be sufficient for different purposes. For example, in various embodiments, two streamers may be considered "parallel" if their approximate directions differ by at most 0.1°, 0.5°, 1°, 2°, 3°, 4°, 5°, 10°, 15°, or 20°. For purposes of this disclosure, "parallel" may be taken to mean "having approximate directions within 5°," and "substantially parallel" may be taken to mean "having approximate directions within 10°."

Figure 2:
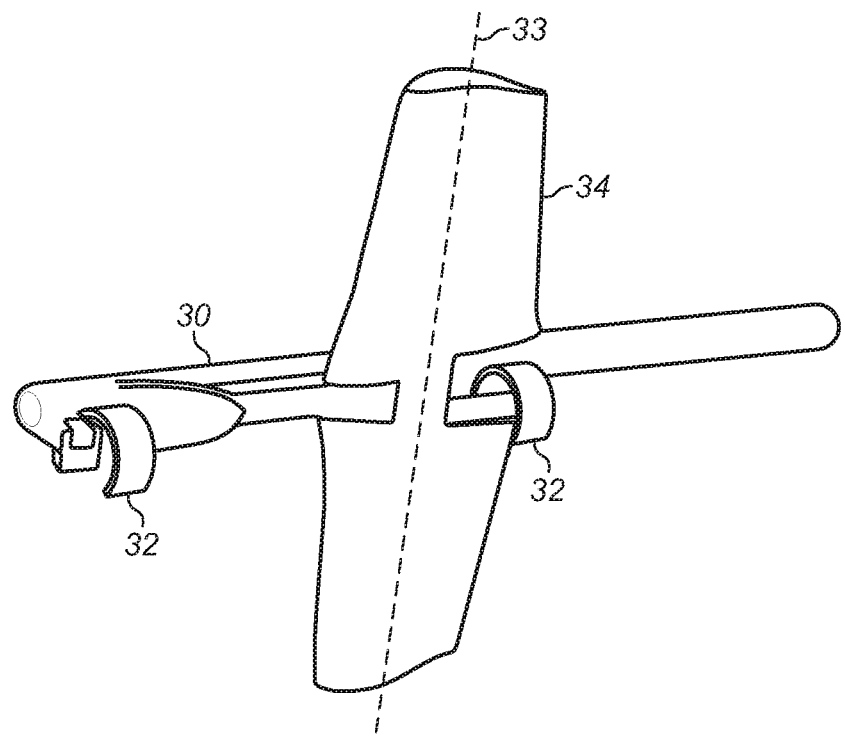
FIG. 2 depicts a streamer deflecting device.

FIG. 2 shows an example of a bird 30 capable of providing lateral control to a streamer.

Bird 30 includes attachment devices 32 for being coupled to a streamer 20. As streamer 20 and bird 30 move through the water, the angle of wing 34 about wing axis 33 determines the amount of lateral force provided by bird 30 to streamer 20. This wing angle may be controlled at a plurality of birds 30 attached to streamer 20 to provide the desired amount and direction of lateral force at various points along the length of streamer 20, in order to change the orientation of the streamer. Many different types of lateral control devices are known in the art, and bird 30 is provided only as an example of such a device.

Figure 3:
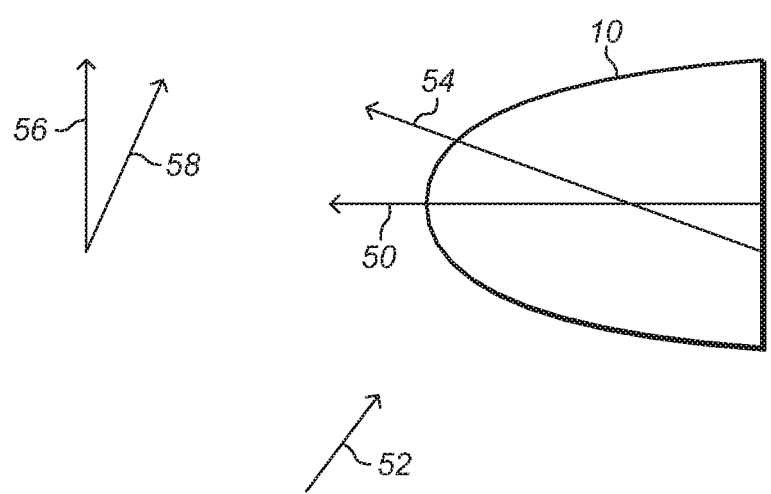
FIG. 3 depicts a vessel and some possible reference axes relative to which a streamer feather angle might be measured.

FIG. 3 shows exemplary reference axes relative to which a streamer feather angle may be measured. The heading of survey vessel 10 is one viable choice, shown as heading axis 50. In the figures that follow, heading axis 50 will be used; other options, as discussed below, are also possible.

In the presence of crosscurrent 52, the actual direction of travel of survey vessel 10 may differ from its heading; thus direction of travel may also be a useful reference axis. This is shown as direction of travel axis 54. Other possibilities include true north 56 and magnetic north 58. Other possibilities (not shown) include the streamer-front-end direction and the preplot direction for the survey. What is meant by "preplot direction" is the ideal track of the vessel. For example, in a 3D survey, the preplot lines are typically equally distributed, parallel (or substantially parallel) lines along the survey area, separated by a distance equal to the width of the area covered in one pass. In a 4D survey, the preplot direction typically follows the actual previous track of the vessel. The preplot direction thus may be constant (such as for each line of a 3D survey) or variable (such as in 4D surveys).

In some embodiments, the preplot lines may be circular. For example, the ideal track of the vessel may be a series of overlapping, continuously linked circles. The circles may have approximately the same focus or different foci. In these embodiments, the paths of streamers 20 are equally distributed over a predetermined area around the preplot line. For example, streamers 20 can be equally distributed across a predetermined lateral width.

Some of the more common choices for a reference axis have been provided; however, a reference axis may be any suitable axis and merely provides a frame of reference for measuring streamer feather angles.

Figure 4A:
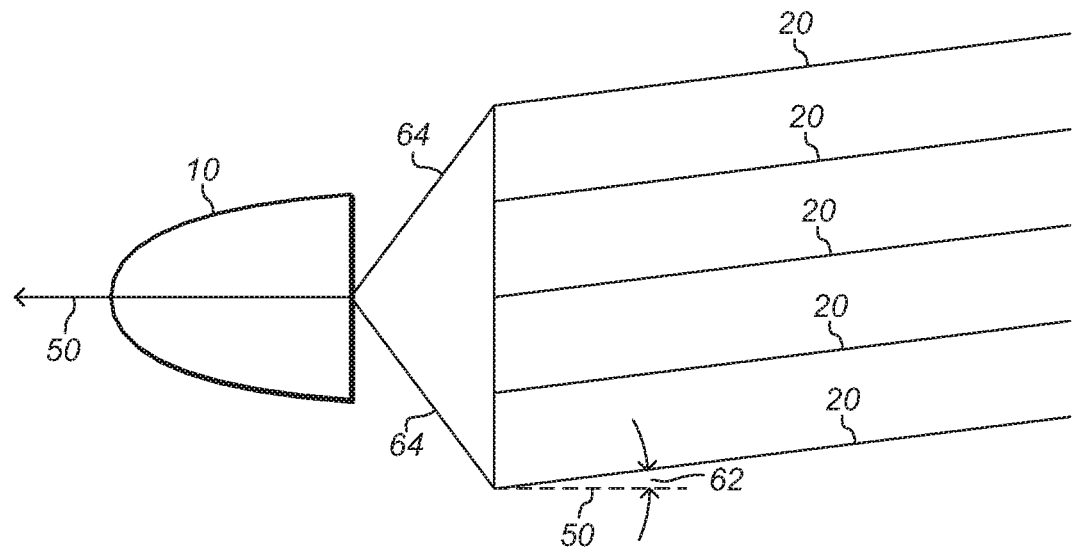
FIG. 4A depicts a vessel towing a plurality of streamers at a feather angle.

FIG. 4A shows survey vessel 10 towing a plurality of streamers 20. For simplicity, paravanes 14, paravane tow ropes 8, lead-in cables 16 and 18, lead-in cable terminations 20A, and spreader ropes or cables 24 are not shown separately in this figure or the figures that follow. These various components have been combined into rigging 64. Further, the various devices along the length of streamers 20 have been omitted for simplicity.

As shown, heading axis 50 has been chosen as the reference axis in this example. Streamers 20 are shown oriented at initial feather angle 62 relative to heading axis 50. Control equipment (not shown) may be configured to control the birds arranged along each streamer 20 to provide the necessary wing angles to maintain a particular feather angle. It is typically desirable to have streamers at a feather angle near zero (relative to either heading axis 50 or direction of travel axis 54). With crosscurrents, however, a feather angle of zero may not always be feasible. Further, crosscurrents may vary, both as a function of time as the survey progresses, and as a function of position along the length of streamers 20. Thus in some instances, a bird may experience a particularly strong crosscurrent that must be counteracted to maintain the feather angle. Accordingly, some birds may have to use excessive wing angles to provide the required amount of force to maintain a particular feather angle and/or streamer orientation. Increasing the amount of force produced by a bird tends to increase the turbulence and noise generated thereby, which may negatively impact the quality of the data gathered in the survey. Accordingly, in some situations, it may be desirable to decrease the noise generated by the birds by changing the feather angle. In one embodiment, this change may involve increasing the feather angle.

According to one embodiment of the present disclosure, changing the feather angle may be carried out by attempting to determine a feather angle that reduces the sum of the forces generated by the birds (or by any chosen subset of the birds, or the force generated by a particular bird). In some embodiments, a feather angle may be determined to attempt to minimize or significantly reduce such forces. Because minimization may not always be possible or feasible, approximate minimization may be an acceptable alternative to minimization. Various levels of approximate minimization may be considered sufficient in various embodiments. For example, the maximum force that can be applied by a bird may be taken to be 100%, and the actual minimum force possible may be taken to be 0%. For purposes of this disclosure, however, the term "minimization" should be interpreted to include anything less than or equal to 5% of the maximum force. The term "approximate minimization" should be interpreted to include anything less than or equal to 20% of the maximum force. In various other embodiments, it may be considered sufficient for the value to be anything less than or equal to 0.1%, 0.5%, 1%, 2%, 3%, 4%, 5%, 10%, 15%, 20%, 25%, 30%, 35%, 40%, 45%, or 50% of the maximum force.

In this way, a desired feather angle reducing, minimizing, or approximately minimizing a desired force or a desired force sum may be determined. This desired feather angle will tend to simply follow the average crosscurrent. This embodiment may be useful in situations where the actual feather angle is not of particular importance, but minimizing bird noise is important. Bird noise may typically be a larger concern than feather angle, one of ordinary skill in the art will understand the tradeoff between steering and acceptable noise level. Further, in some cases it may not be possible or feasible to reach a desired feather angle due to strong crosscurrents; in such cases, it may be advantageous to use a strategy that allows the feather angle to follow the average crosscurrent, keeping the streamers straight and correctly separated.

Figure 4B:
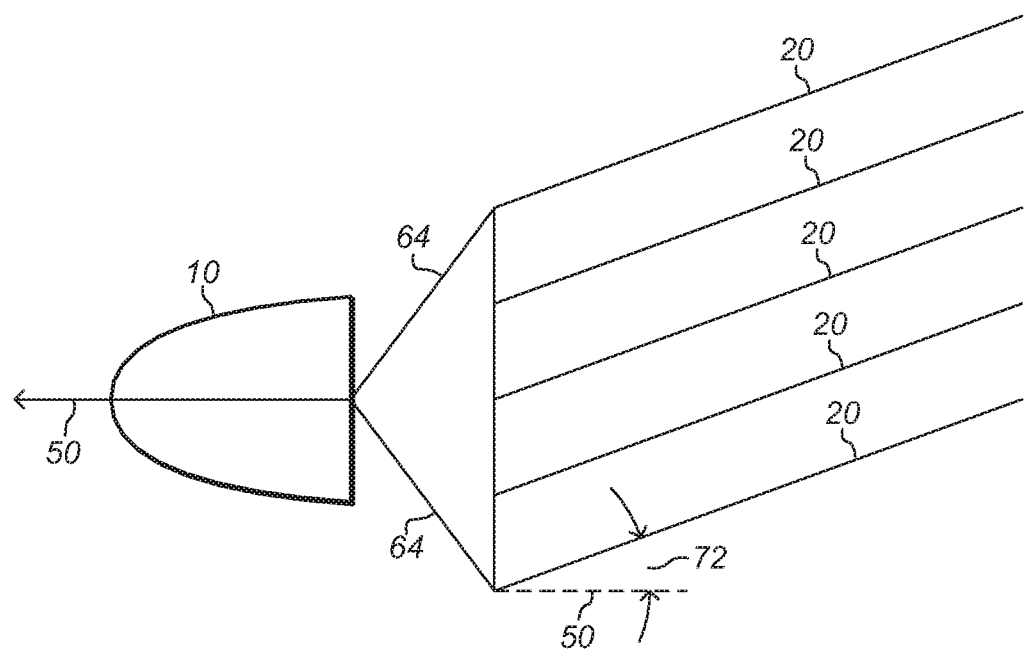
FIG. 4B depicts the vessel of FIG. 4A towing the streamers at a different feather angle.

FIG. 4B shows the same elements as FIG. 4A, but feather angle 62 has been adjusted to new feather angle 72, which is increased relative to feather angle 62. The actual angles depicted are not necessarily to scale. The increase from feather angle 62 to new feather angle 72 is typically carried out in order to reduce the forces generated by the birds. However, the pursuit of various objectives may lead to different values for new feather angle 72.

As described above, the increase in feather angle typically leads to a reduction in bird forces. This force reduction may be carried out one time, continuously, or periodically based on the bird forces. In one embodiment, the force reduction may be based on the instantaneous (e.g., momentary) forces produced by the birds. Additionally, force reduction may include a time-filtering, time-averaging, and/or force integration aspect in order to suppress any potential instability and/or oscillations in the determined desired feather angle that may be caused by adjustments to the feature angle every second where short-duration (e.g., on the scale of one-second) changes in crosscurrents may have an undesirably large impact on the desired feather angle. For example, the forces being produced by the birds may be averaged over a 30-second time interval, a 60-second time interval, a two-minute time interval, or any other suitable interval, to determine a desired feather angle that is less dependent upon momentary fluctuations in crosscurrents and bird forces.

A desired feather angle may be determined not simply to reduce, minimize, or approximately minimize bird forces, but to maintain them below some desired threshold value while keeping the desired feather angle as close as possible to some reference feather angle (e.g., a predefined ideal value). In this embodiment, the feather angle adjustment also may be carried out one time, continuously, or periodically based on the bird forces. The feather angle may also be based on the instantaneous (e.g. momentary) forces produced by the birds; however, the feather angle may include a time-filtering, time-averaging, and/or force integration aspect in order to suppress instability and/or oscillations in the determined desired feather angle. This embodiment may be useful in situations where a tradeoff between an optimal feather angle and noise produced by bird forces is desired.

These embodiments of reducing bird forces or maintaining bird forces below a threshold may also depend on certain other conditions. For example, the control system might require operator confirmation before implementing a feather angle change. In some embodiments, the control system may allow feather angle changes only at the end of a survey line and before the next survey line begins, in order to provide a consistent feather angle for each survey line.

Figure 5A:
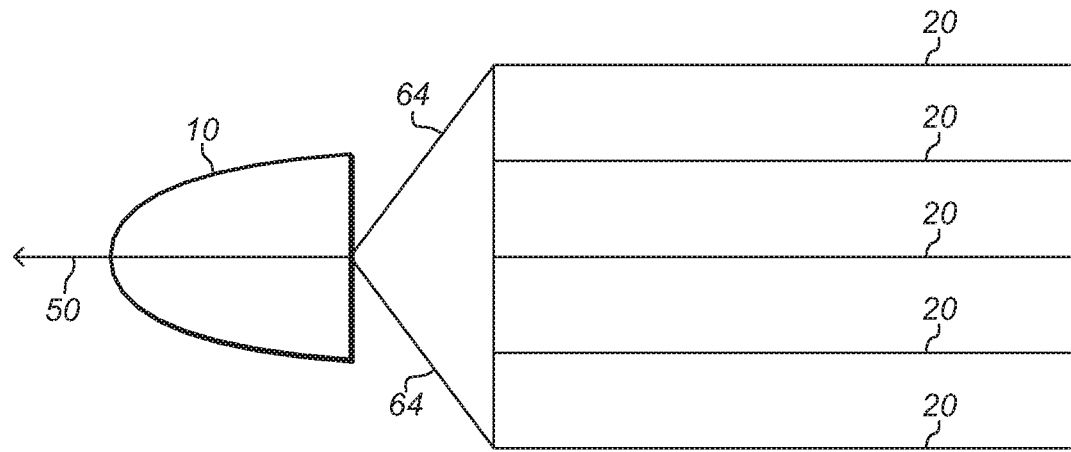
FIG. 5A depicts a vessel towing a plurality of streamers in one orientation.
Figure 5B:
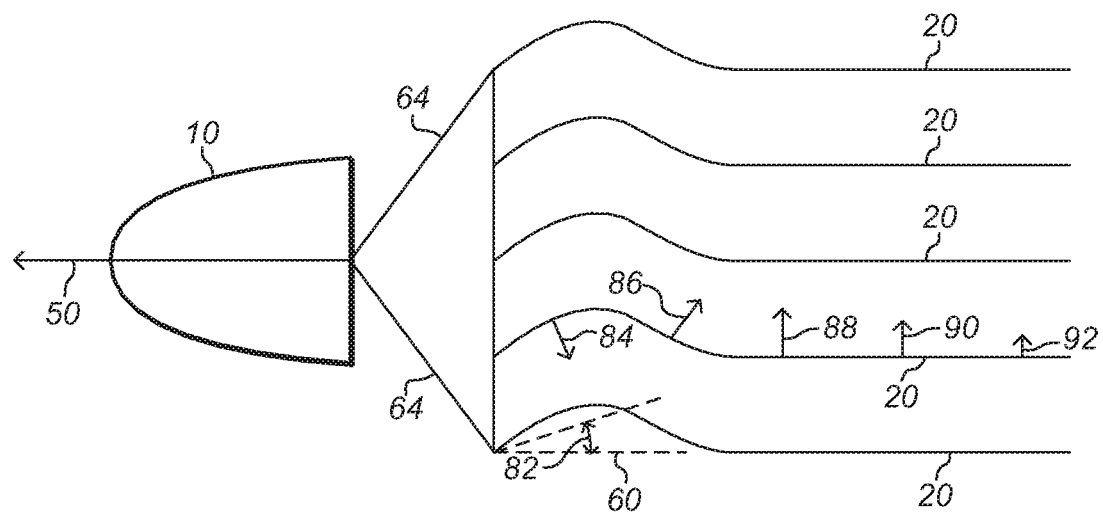
FIG. 5B depicts the vessel of FIG. 5A towing the streamers in a different orientation.

FIGS. 5A and 5B show another embodiment of adapting streamer orientation in response to forces being produced by the birds. In FIG. 5A, survey vessel 10 is towing streamers 20 at an initial feather angle of approximately zero, relative to heading axis 50. This configuration may be desirable when crosscurrents are relatively small to give good survey coverage.

As noted above, however, crosscurrents may vary not just with time, but also along the length of streamers 20. As shown in FIG. 5B, a strong crosscurrent at the forward portion of streamers 20 has deflected the forward portion of streamers 20 to some extent. However, survey vessel 10 has not travelled far enough for the rear portion of streamers 20 to have encountered this crosscurrent yet. In a situation such as this, it may be desirable to adapt the streamer feather angle to take into account the fact that the rear portions of streamers 20 are likely to experience a similar crosscurrent, but at a later time. Thus, a desired feather angle may be chosen to proactively position the rear portions of streamers 20 along a feather angle that takes into account this strong crosscurrent. Accordingly, the control system has determined new desired feather angle 82.

Bird forces along the length of streamers 20 may then be determined in order to identify a desired orientation for the streamer in a straight line at a new desired feather angle 82. It is appreciated that while a perfectly straight line may be the optimal arrangement for a streamer, no such perfectly straight line exists in nature. Accordingly, minor deviations from perfection may be considered acceptable here. It is further appreciated that while the desired orientation may in fact be a perfectly straight line, in the real world the actual orientation will always be an approximation thereof.

By way of example, one method of quantifying the "straightness" of a streamer might be as follows. Let "$L_{actual}$" be defined as the distance between the two ends of the streamer as they are positioned in the water (i.e. the length of the streamer in its actual configuration). Let "$L_{straight}$" be defined as the length the streamer would have if it were completely straight (i.e. the ideal length of the streamer). The streamer's straightness "S" can then be defined as $S=L_{actual}/L_{straight}$. Under this definition, S can be seen as a percentage value that indicates how "close" to being straight the streamer is. In various embodiments, it might be sufficient for a streamer to have an S value of 50%, 55%, 60%, 65%, 70%, 75%, 80%, 85%, 90%, 95%, 96%, 97%, 98%, 99%, 99.5%, 99.9%, or 100%.

For purposes of this disclosure, the term "straight" may be taken to mean an S value of 90% or more. The term "approximately straight" may be taken to mean an S value of 80% or more.

Bird forces 84, 86, 88, 90, and 92 are shown as distinct in FIG. 5B in order to illustrate that various forces may be desired at different positions along the length of streamers 20, and they need not be the same as one another. By using the predictive aspect of this embodiment, the peak forces required from the birds may be reduced.

FIG. 5B illustrates the above-described situation by showing the case where the crosscurrent is strong enough that the birds attached to the forward portion of streamers 20 are unable to maintain the feather angle of zero (or whatever the initial feather angle may have been). A similar situation may occur, however, when the birds attached to the forward portion of streamers 20 are able to maintain the initial feather angle, but only by producing undesirably large lateral forces. In that situation as well, it may be desirable for the control system to determine new desired feather angle 82.

It should be noted that, while the above discussion focuses on the use of forces produced by birds in determining a desired streamer feather angle or orientation, various other quantities may also be used as a substitute for force. For example, configuration data for the birds may be a useful proxy for force. Configuration data may include information regarding the wing angles of birds, or other information indicative of the birds' current state or indicative of how much force or noise the birds are outputting to maintain a feather angle and/or streamer orientation. Further, configuration data may include any information indicative of crosscurrents, including but not limited to direct measurement of crosscurrents.

Figure 6:
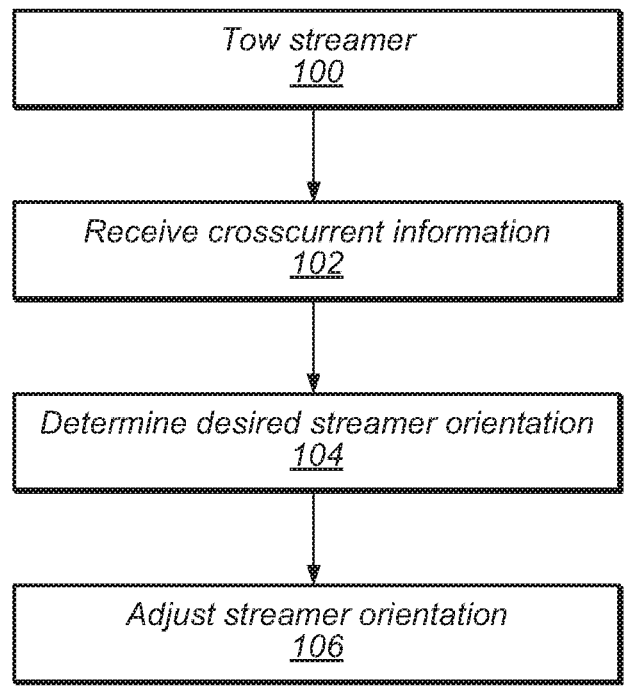
FIGS. 6 and 7 depict two exemplary process flows according to embodiments of the present disclosure.

FIG. 6 shows an exemplary process flow for an embodiment according to the present disclosure.

At step 100, a streamer is towed in a body of water. At this step in this process flow, the streamer has an initial orientation. The initial orientation may be a straight line at a particular feather angle relative to some reference axis, or it may be an approximately straight line at an approximate feather angle, or it may be a non-linear orientation.

At step 102, information relating to crosscurrents in the body of water is received. As discussed above, this information may be based on forces produced by devices along the streamer, or based on configuration data, or based on any source of information related to crosscurrents.

At step 104, a desired streamer orientation is determined, based on the received information relating to the crosscurrents. For example, the desired orientation may be a straight line at a feather angle that follows the average crosscurrents in the body of water.

At step 106, the orientation of the streamer is adjusted based on the determined desired streamer orientation. This adjustment may be carried out via positioning devices (e.g. birds) along the length of the streamer.

Figure 7:
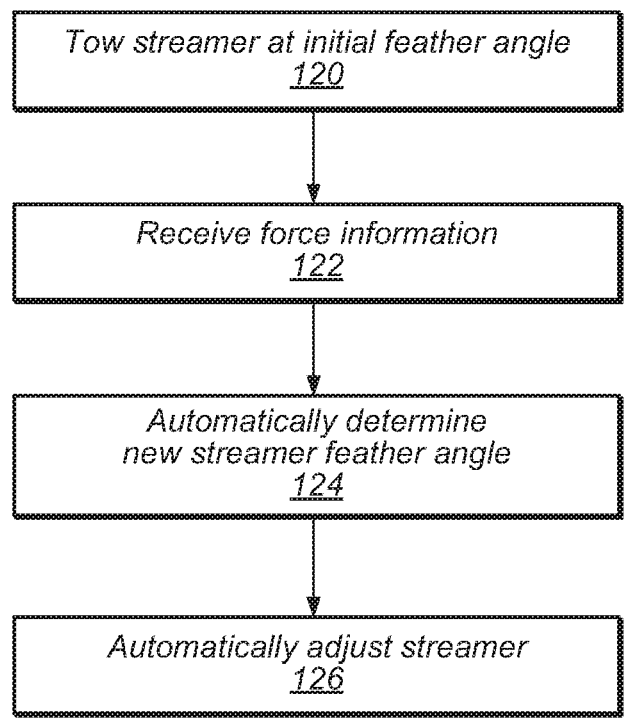

FIG. 7 shows another exemplary process flow for an embodiment according to the present disclosure.

At step 120, a streamer is towed in a body of water at an initial feather angle. The streamer may include, among other components, a plurality of deflecting devices arranged at various positions along its length for providing forces to the streamer.

At step 122, information relating to forces produced by the deflecting devices along the length of the streamer is received. These forces may be the forces needed to maintain the streamer at its initial feather angle. This received information may be related to direct or indirect measurements of such forces, and it may be based on data received from the plurality of deflecting devices.

At step 124, a new desired streamer feather angle is automatically determined. As discussed in more detail above, the desired streamer feather angle may be determined in order to reduce the amount of force necessary from the plurality of deflecting devices, to predictively place the streamer in an advantageous orientation based on measured crosscurrent conditions, or in any other way that takes account of forces output by the plurality of deflecting devices. The new desired streamer feather angle may be a straight line measured relative to a reference axis. The automatic determination may be made without user input or interaction.

At step 126, the streamer orientation is automatically adjusted based on the new streamer feather angle. Prior to the automatic adjustment, the control system may or may not require user input and/or confirmation. This adjustment may be carried out via deflecting devices along the length of the streamer.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   a plurality of streamers that include deflecting devices configured to apply forces to respective streamers;
   a vessel configured to tow the streamers in a body of water; and
   a control system configured to:
      determine a desired orientation of the streamers based on information relating to crosscurrents in the body of water, wherein the desired orientation includes a desired feather angle that is determined to maintain a sum of respective forces applied by at least a subset of the deflecting devices below a threshold value; and
      adjust the streamers based on the desired orientation.

2. The system of claim 1, wherein the desired orientation includes the desired feather angle being applied to each of the plurality of streamers.

3. The system of claim 1, wherein the at least a subset of the deflecting devices includes all of the deflecting devices.

4. The system of claim 1, wherein to determine the desired orientation, the control system is further configured to determine a desired orientation for a rear portion of at least one streamer based at least in part on information relating to crosscurrents at a forward portion of at least one streamer.

5. The system of claim 1, wherein the desired orientation of the streamers includes each streamer being oriented in a straight line or an approximately straight line.

6. The system of claim 1, wherein the control system is located on the vessel.

7. The system of claim 1, wherein at least one of the plurality of streamers includes a plurality of geophysical sensors.

8. The system of claim 1, wherein the information relating to crosscurrents in the body of water includes information indicative of direction and speed of crosscurrents at a plurality of positions along at least one of the plurality of streamers.

9. The system of claim 1, wherein the desired feather angle is further determined such that a difference between the desired feather angle and a reference feather angle is minimized subject to the sum of the forces being maintained below the threshold value.

10. A method of generating a geophysical data record, comprising:
    towing a plurality of streamers behind a vessel in a body of water, wherein the streamers have a plurality of deflecting devices arranged therealong, and wherein the streamers further include one or more geophysical sensors;

receiving information regarding forces exerted by the plurality of deflecting devices;

automatically determining a desired feather angle based on information regarding forces exerted by the plurality of deflecting devices, wherein the desired feather angle is determined to maintain a sum of the forces exerted by at least a subset of the plurality of deflecting devices below a threshold value;

automatically adjusting at least one of the plurality of streamers, via the plurality of deflecting devices, to follow the determined desired feather angle; and during the towing, generating the geophysical data record, the geophysical data record including a record of signals detected by the one or more geophysical sensors stored in a manner suitable for later interpretation.

11. The method of claim 10, wherein the desired feather angle is determined to minimize the sum.

12. The method of claim 10, wherein the desired feather angle is determined relative to a reference axis that is a preplot direction of the vessel.

13. The method of claim 10, wherein the desired feather angle is determined relative to a reference axis that is a front-end direction of at least one streamer.

14. The method of claim 10, wherein the desired feather angle is further determined to reduce one or more instantaneous forces exerted by the plurality of deflecting devices.

15. The method of claim 10, wherein the sum of the forces is a sum of time-averaged forces.

16. The method of claim 10, wherein the information regarding forces is based at least in part on information relating to crosscurrents in the body of water.

17. The method of claim 16, wherein the information relating to crosscurrents includes information indicative of direction and speed of crosscurrents at a plurality of positions along at least one of the plurality of streamers.

18. The method of claim 10, wherein automatically determining the desired feather angle is further performed such that a difference between the desired feather angle and a reference feather angle is minimized subject to the sum of the forces being maintained below the threshold value.

19. A streamer control apparatus, comprising:

at least one processor;

wherein the at least one processor is configured to communicate with a plurality of positioning devices arranged along a plurality of streamers towed in a body of water, the plurality of positioning devices being configured to apply respective forces to the plurality of streamers;

wherein the at least one processor is further configured to determine, based on state information indicative of crosscurrent conditions, a desired orientation for the plurality of streamers that includes a feather angle that is determined to maintain a sum of at least a subset of the respective forces below a threshold value; and wherein the at least one processor is further configured to adjust the plurality of positioning devices based on the desired orientation.

20. The streamer control apparatus of claim 19, wherein the state information further includes a present wing angle of at least one of the plurality of positioning devices.

21. The streamer control apparatus of claim 19, wherein the streamer control apparatus is further configured to adjust the plurality of positioning devices based on the desired orientation continuously or periodically.

22. The streamer control apparatus of claim 19, wherein the feather angle is determined to follow an average crosscurrent in the body of water.

23. The streamer control apparatus of claim 19, wherein the feather angle is automatically determined such that a difference between the feather angle and a reference feather angle is minimized while the sum is maintained below the threshold value.

24. The streamer control apparatus of claim 19, wherein to determine the desired orientation, the at least one processor is further configured to determine a desired orientation for a rear portion of at least one streamer based at least in part on information relating to crosscurrents at a forward portion of at least one streamer.

* * * * *